US010533912B2

(12) United States Patent
Hugel et al.

(10) Patent No.: US 10,533,912 B2
(45) Date of Patent: Jan. 14, 2020

(54) FLANGE-SET FOR A PRESSURE DIFFERENCE MEASURING TRANSDUCER

(71) Applicant: Endress + Hauser GmbH + Co. KG, Maulburg (DE)

(72) Inventors: Michael Hugel, Lorrach (DE); Thomas Uehlin, Schopfheim (DE); Benjamin Lemke, Berlin (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 196 days.

(21) Appl. No.: 15/709,555

(22) Filed: Sep. 20, 2017

(65) Prior Publication Data

US 2018/0087986 A1    Mar. 29, 2018

(30) Foreign Application Priority Data

Sep. 23, 2016 (DE) .................. 10 2016 117 989

(51) Int. Cl.
    *G01L 13/02* (2006.01)
    *G01L 19/00* (2006.01)
    *G01L 19/14* (2006.01)

(52) U.S. Cl.
    CPC ................. *G01L 19/0046* (2013.01)

(58) Field of Classification Search
    CPC ....... G01L 13/02; G01L 13/025; G01L 19/00; G01L 19/003; G01L 19/0046; G01L 19/0681; G01L 19/14; G01L 19/142
    See application file for complete search history.

(56) References Cited

U.S. PATENT DOCUMENTS 3,319,468 A * 5/1967 Baumann .................. G01F 1/38
                                                    73/718
4,321,578 A * 3/1982 Nagasu ................. G01L 13/025
                                                    338/4

(Continued)

FOREIGN PATENT DOCUMENTS

CN         1195400 A    10/1998
CN       201963644 U     9/2011

(Continued)

OTHER PUBLICATIONS

German Search Report, German Patent Office, Munich, DE, dated Jan. 24, 2017.
International Search Report, EPO, The Netherlands, dated Feb. 15, 2018.
First Office Action dated Sep. 5, 2019 in corresponding Chinese Appln. No. 201710865375.8.

*Primary Examiner* — Nguyen Q. Ha
(74) *Attorney, Agent, or Firm* — Bacon & Thomas, PLLC

(57) ABSTRACT

A flange-set for a pressure difference measuring transducer with two flanges mountable on external sides of a measuring mechanism of the pressure difference measuring transducer lying opposite one another and containing membranes to be loaded with pressures, as well as a pressure difference measuring transducer equipped with the flange-set. Each of the flanges comprises: a wall, which in the mounted state covers one of the two membranes of the measuring mechanism and encloses a pressure chamber bordering on such membrane. Arranged on a first side of the wall is a first process connection, which includes a pressure duct connection region, in which opens a pressure duct extending through the flange to the pressure chamber. The first process connections are embodied in such a manner that a pressure difference measuring transducer equipped with the flange-set is mountable and connectable via the first process connections (without interpositioning of an adapter) on a (Continued)

process connection, which has a first process connection geometry designed for the connection and mounting of pressure difference measuring transducers with measuring mechanisms having membranes arranged next to one another in a plane.

14 Claims, 5 Drawing Sheets

(56) References Cited

U.S. PATENT DOCUMENTS

| | | | |
|---|---|---|---|
| 6,279,401 B1 * | 8/2001 | Karas | G01L 13/026 |
| | | | 73/716 |
| 6,918,303 B2 | 7/2005 | Casimiro | |
| 2005/0034523 A1 | 2/2005 | Casimiro et al. | |
| 2016/0370245 A1 * | 12/2016 | Haldorsen | G01L 19/147 |
| 2017/0010169 A1 | 1/2017 | Hugel | |
| 2017/0227412 A1 | 8/2017 | Becher | |

FOREIGN PATENT DOCUMENTS

| | | |
|---|---|---|
| CN | 202901610 U | 4/2013 |
| CN | 106062526 A | 10/2016 |
| DE | 112004001504 T5 | 10/2006 |
| DE | 102014102719 A1 | 9/2015 |
| DE | 102014110615 A1 | 1/2016 |
| GB | 681921 A * | 10/1952 ............ G01L 7/084 |

* cited by examiner

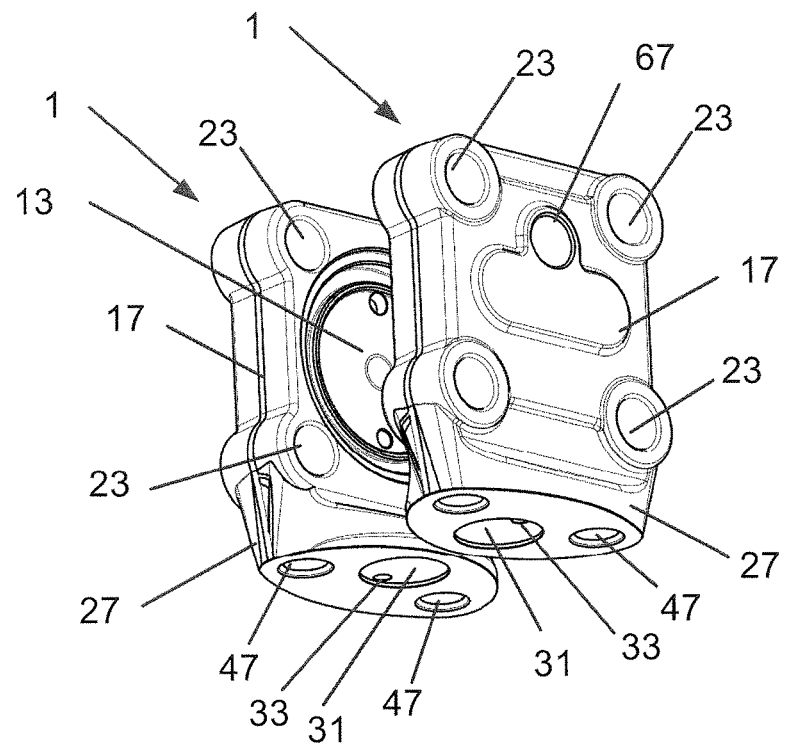
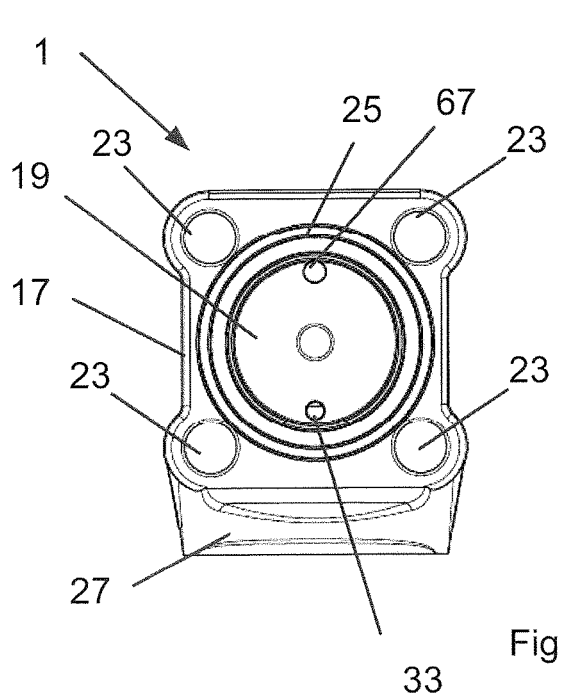
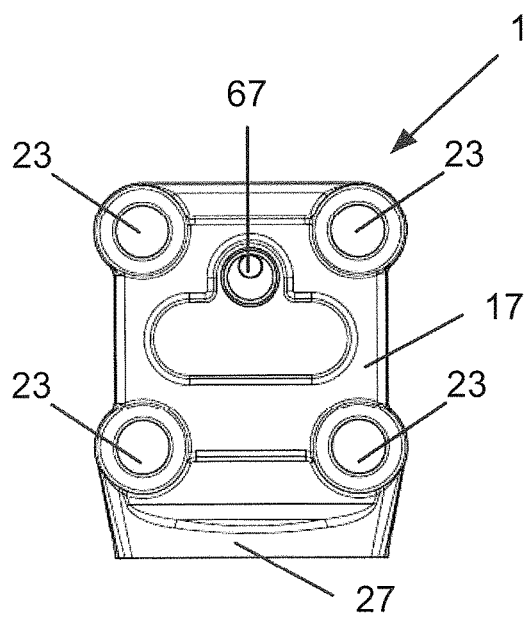
Fig. 1
Fig. 2
Fig. 3

FLANGE-SET FOR A PRESSURE DIFFERENCE MEASURING TRANSDUCER

TECHNICAL FIELD

The invention relates to a flange-set for a pressure difference measuring transducer with two flanges mountable on external sides of a measuring mechanism of the pressure difference measuring transducer lying opposite one another and containing membranes to be loaded with pressures, each of which flanges comprises:
 a wall, which in the mounted state covers one of the two membranes of the measuring mechanism and encloses a pressure chamber bordering on such membrane, and, arranged on a first of four, pairwise oppositely lying sides of the wall, a first process connection, which includes a pressure duct connection region, into which opens a pressure duct extending through the flange to the pressure chamber.

The invention also relates to a pressure difference measuring transducer equipped with such a flange-set.

BACKGROUND DISCUSSION

Pressure difference measuring transducers comprise a measuring mechanism equipped with a pressure difference sensor and having two membranes to be loaded, respectively, with the two pressures during operation. For this in industrial measurements technology, two measuring mechanism variants have become established, which differ from one another in the arrangement of the membranes.

In the case of the first measuring mechanism variant, the two membranes are arranged in a plane next to one another on one and the same external surface of the measuring mechanism. In the case of this variant, the membranes are isolating diaphragms, which, in each case, outwardly terminate one of the pressure transfer means connected before the pressure difference sensor and transferring the pressure acting on the outside of the isolating diaphragm to the pressure difference sensor.

In the case of these measuring mechanisms, the face of the measuring mechanism surrounding the two membranes can be embodied as a process connection flange, via which the pressure difference measuring transducer can be mounted on a process connection provided at a measuring point and connected to working pressure lines, via which the membranes are contactable during operation with the two pressures. Such a pressure difference measuring transducer is known e.g. from German patent, DE 10 2014 102 719 A1. The pressure difference measuring transducer described there is mounted on a process connection of a valve block with interpositioning of a plate-shaped spacer.

Alternatively, there can be provided on the face of measuring mechanisms of the first variant containing the isolating diaphragms a front cover, under which are enclosed on its inner side, arranged in a plane next to one another, two pressure chambers, each of which adjoins one of the two isolating diaphragms, and on whose outside a process connection is provided, via which the pressure difference measuring transducer can be mounted on a process connection provided at a measuring point and connected to working pressure lines.

In the case of the second measuring mechanism variant, the two membranes are arranged on external sides of the measuring mechanism lying diametrically opposite one another. The membranes of the second measuring mechanism variant can likewise be isolating diaphragms of the pressure difference sensor connected in front of pressure transfer means. Alternatively, they can, however, also be medium resistant membranes of the pressure difference sensor mounted in the measuring mechanism. Thus, for example, in German patent, DE 103 47 861 A1, a pressure difference measuring transducer is described having mounted in a measuring mechanism a ceramic pressure difference sensor, whose measuring membranes form the membranes to be loaded with pressure and arranged on the oppositely lying, external sides of the measuring mechanism.

Measuring mechanisms of pressure difference measuring transducers comprising this second variant are usually equipped with a flange-set, which includes two flanges to be mounted on the two, oppositely lying, external sides of the measuring mechanism. Thus, described, for example, in DE 103 47 861 A1 is a flange-set, which has, mounted on the two oppositely lying, external sides of the measuring mechanism, two flanges, each of which comprises
 a wall, which in the mounted state covers one of the two membranes of the measuring mechanism and encloses a pressure chamber bordering on such membrane, and arranged on a first of four, pairwise oppositely lying sides of the wall, a first process connection, which includes a pressure duct connection region, into which opens a pressure duct extending through the flange to the pressure chamber.

The flanges described in DE 103 47 861 A1 include, in each case, an identically formed, second process connection arranged on its side lying opposite the side containing the first process connection. This offers the advantage that the pressure ducts opening into the two process connections not required for mounting can be utilized, in order, when required, to ventilate the pressure chambers or to let condensate escape.

Such a ventilation, or the draining of condensate, is in the case of pressure difference measuring transducers with measuring mechanisms of the first variant not directly possible. The problem is that the pressure chambers adjoining the membranes are arranged here in a plane next to one another, as well as that, on the side of the front covers lying opposite the process connection, two other process connections cannot be directly provided for aerating the pressure chambers or removing condensate, because the measuring mechanism is located on that side.

In the case of measuring mechanisms of the first variant, the membrane centers of the membranes arranged next to one another in a plane have a separation, which is less than the separation between the membrane centers of membranes arranged on external sides of measuring mechanisms of the second variant lying opposite one another.

This has led to the result that, for the mounting and connection of pressure difference measuring transducers, two different process connection geometries have been established, which differ in the arrangement of their pressure duct connection regions. In such case, the two pressure duct connection regions of process connections with a first process connection geometry established for the connection and mounting of pressure difference measuring transducers with measuring mechanisms of the first variant are arranged with a smaller separation from one another than the two pressure duct connection regions of process connections with a second process connection geometry established for the connection and mounting of pressure difference measuring transducers with measuring mechanisms of the second variant. Established as second process connection flange geometry in industrial measurements technology is the flange connection geometry detailed in DIN EN 61518 of the German Institute for Standardization and in the corresponding standard IEC 6158 of the International Electrotechnical Commission.

Due to the different process connection geometries, measuring transducers with measuring mechanisms of the second variant cannot be applied directly onto process connections provided for measuring transducers with measuring mechanisms of the first variant.

This problem can in some cases of application be overcome by connecting measuring transducer and process connection with one another via an adapter arranged therebetween, which adapter is embodied in such a manner that it interfaces the second process connection geometry present on the measuring transducer side into the first process connection geometry provided on the measuring point side.

The interposing of an adapter causes, however, additional costs and an additional assembly effort. Moreover, a pressure tight sealing of the two pressure transfer paths extending through the adapter both between the adapter and the measuring transducer, as well as also between the adapter and the measuring point process connection, must be assured. Moreover, an adapter can only be applied, when sufficient space for the adapter is present at the location of use.

SUMMARY OF THE INVENTION

It is an object of the invention to provide means, which enable use of measuring mechanisms of the second variant on process connections having the first process connection geometry without having to interpose an adapter.

To achieve the object, the invention resides in a flange-set for a pressure difference measuring transducer with two flanges mountable on external sides of a measuring mechanism of the pressure difference measuring transducer lying opposite one another and containing membranes to be loaded with pressures, each of which flanges comprises:
  a wall, which in the mounted state covers one of the two membranes of the measuring mechanism and encloses a pressure chamber bordering on such membrane, and arranged on a first of four, pairwise oppositely lying sides of the wall, a first process connection, which includes a pressure duct connection region, in which opens a pressure duct extending through the flange to the pressure chamber,
characterized in that
  the first process connections are embodied in such a manner that a pressure difference measuring transducer equipped with the flange-set is mountable and connectable via the first process connections on a process connection, which has a first process connection geometry designed for the connection and mounting of pressure difference measuring transducers with two pressure loadable membranes arranged on one and the same external side of their measuring mechanism.

The flange-sets of the invention enable use of measuring mechanisms of the second variant, as well as pressure difference measuring transducers equipped therewith, on process connections having the first process connection geometry, without having to interpose an adapter.

In such case, the first process connections also enable a mounting at locations of use, where an adapter cannot be applied for reasons of space. Since no adapter needs to be interposed, there results a higher vibration resistance and the seals supplementally required in the case of use of adapters between the adapter and the measuring point side process connection are not present.

A further advantage provides that flange-set of the inventions are applied not only for initial manufacture of measuring mechanisms of the first variant, but also for the retrofitting of existing pressure difference measuring transducers containing such measuring mechanisms.

A first embodiment is characterized in that
  the first process connections each include two bores,
    which serve for accommodating securing means, especially bolts, via which the first process connection is securable on half of a process connection having the first process connection geometry, and
    which are arranged in such a manner that the bores of the two flanges in the mounted state on the measuring mechanism are arranged in a rectangle, and
    the pressure duct connection regions of the first process connections are each arranged centrally between the two bores and offset in a direction parallel to a surface normal to the inner side of the wall of the flange inwardly pointing from an imaginary line connecting the two bores.

A second embodiment is characterized in that the first process connections formed on the first sides comprise auxiliary flanges, each of which comprises a flange region adjoining the first side and a projection following on its inner side directed parallel to the inner side of the wall.

A further development of the second embodiment is characterized in that the base areas of the projections continuously increase in direction extending from the first side to the process connection surface of the first process connection, wherein the base areas are especially essentially circular segment shaped or ellipse segment shaped base areas and/or the base areas especially increase in such a manner that the projections form on their exterior facing away from the process connection surface an outwardly curved surface as viewed in section.

A first further development of the invention is characterized in that
  a duct is provided in both flanges, extending in each case through the flange wall and opening into the pressure chamber enclosed by the flange, especially into an edge region of the pressure chamber facing away from the first process connection, and
  an element, especially a ventilating screw or a closure, which is mountable by mechanical connecting means, especially releasable connecting means, and which, in the mounted state, outwardly closes the duct, is provided for each duct.

A second further development of the invention is characterized in that each of the flanges has, arranged on a second side, especially on a second side lying opposite the first side, a second process connection, which includes a pressure duct connection region, into which opens a pressure duct extending through the flange to the pressure chamber.

A first embodiment of the second further development is characterized in that
  the second process connections are embodied in such a manner that a pressure difference measuring transducer equipped with the flange-set is mountable and connectable via the second process connections on a process connection, which has a second process connection geometry designed for the connection and mounting of pressure difference measuring transducers with pressure loadable membranes arranged on oppositely lying sides of its measuring mechanism, wherein each of the second process connections comprises a flange formed on the second side, especially an oval flange, in which the pressure duct connection region is arranged centrally on an imaginary line connecting two bores for accommodating securing means.

A second embodiment of the second further development is characterized in that the second process connections are of equal construction to the first process connections.

A third embodiment of the second further development is characterized in that an element is provided for each flange, especially a ventilating screw or a closure, which is mountable on the flange by mechanical connecting means, especially releasable connecting means, and which, in the mounted state, outwardly closes a pressure duct opening into the pressure duct connection region of the first or second process connection.

A third further development of the invention is characterized in that each of the pressure ducts in the first process connections opens in an edge region of the associated pressure duct connection region facing an outside of its flange.

A preferred embodiment of the invention is characterized in that the flanges are embodied of metal, especially a steel, especially a duplex steel or a super duplex steel, wherein they are especially embodied as a one-piece elements, especially as one-piece cast or forged parts.

Furthermore, the invention resides in a pressure difference measuring transducer equipped with a flange-set of the invention, characterized in that the pressure difference measuring transducer includes a measuring mechanism equipped with a pressure difference sensor and having two pressure loadable membranes arranged on external sides of the measuring mechanism lying opposite one another, and the two flanges are mounted on the oppositely lying external sides of the measuring mechanism in an orientation relative to the measuring mechanism such that their first process connections are arranged next to one another in a plane.

A first further development of the pressure difference measuring transducer of the invention is characterized in that a sealing plate is provided, which is placeable on the process connection areas of the first process connections of the flanges, and, in the case of mounting the measuring transducer on a process connection, is clampable between the process connection areas of the two first process connections and the process connection surface of the process connection, and the sealing plate includes two passageways, which, in the emplaced state, give access to the pressure duct connection regions of the first process connections, and which form seal seats for accommodating process seals or are surrounded externally on all sides by a plate region of the sealing plate formed as a process seal.

A further development of a pressure difference measuring transducer of the invention is characterized in that the pressure difference measuring transducer is mounted by means of the first process connections with interpositioning of two process seals on a process connection having the first process connection geometry.

Preferred embodiments of the further developments of the pressure difference measuring transducer are characterized in that the process seals are process seals inserted with press fit or loose fit into further passageways in a sealing plate clamped between the first process connections and the process connection and exposing the pressure duct connection regions, the process seals comprise a cylindrical, form-retaining, base body, on which two radially inwardly extending spring legs are formed in such a manner that the process seals have in cross section an essentially K-shaped profile, the process seals are formed by plate regions of a sealing plate clamped between the first process connections and the process connection, which plate regions surround, externally on all sides, further passageways of the sealing plate exposing the pressure duct connection regions, wherein the plate regions especially comprise concentric, annular ribs produced by plastic deformation on both sides of the sealing plate or are offset through plastic deformation into a new, axially offset equilibrium position relative to the planar surfaces of the sealing plate, or the process seals have a non-metallic coating, especially a thermoplastic coating, especially a coating of a fluoropolymer, especially polytetrafluoroethylene (PTFE) or perfluoroalkoxy polymer (PFA), or a coating of a composite material containing fluoropolymer.

BRIEF DESCRIPTION OF THE DRAWINGS

The invention and other advantages will now be explained in greater detail based on the figures of the drawing, in which four examples of embodiments are shown. Equal elements are provide in the figures with equal reference characters. The figures of the drawing show as follows:

FIG. 1 is a view of a flange-set of the invention;

FIG. 2 is a view of the inner side of a flange of FIG. 1;

FIG. 3 is a view of the outside of a flange of FIG. 1;

DETAILED DISCUSSION IN CONJUNCTION WITH THE DRAWINGS

FIG. 1 shows a view of a flange-set of the invention with two flanges 1 mountable on mutually opposite, external sides of a measuring mechanism of a pressure difference measuring transducer comprising, in each case, a membrane to be loaded with a pressure. FIG. 2 shows a view of the inner side of one of the two flanges 1 of FIG. 1. FIG. 3 shows a view of the outside of one of the two flanges 1 of FIG. 1.

Figure 4:
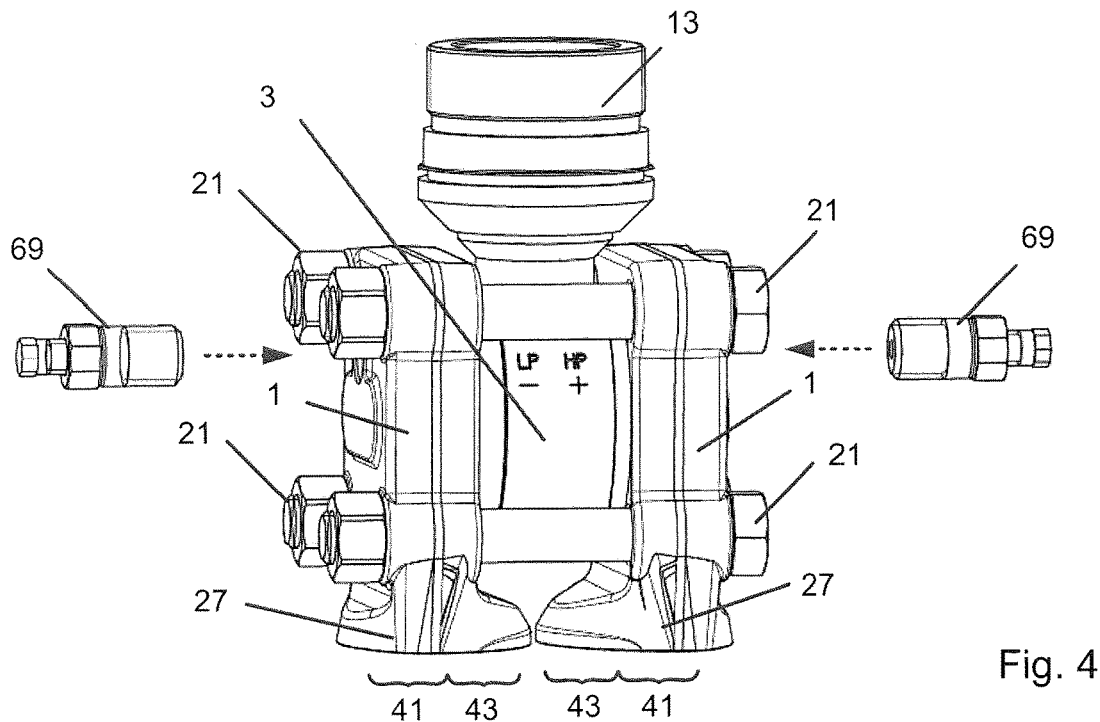
FIG. 4 is a view of a pressure difference measuring transducer.

FIG. 4 shows a view of a pressure difference measuring transducer equipped with the flange-set of FIGS. 1 to 3. FIG.

5 shows a pressure difference measuring transducer in section equipped with an additional example of an embodiment of a flange-set of the invention.

Figure 5:
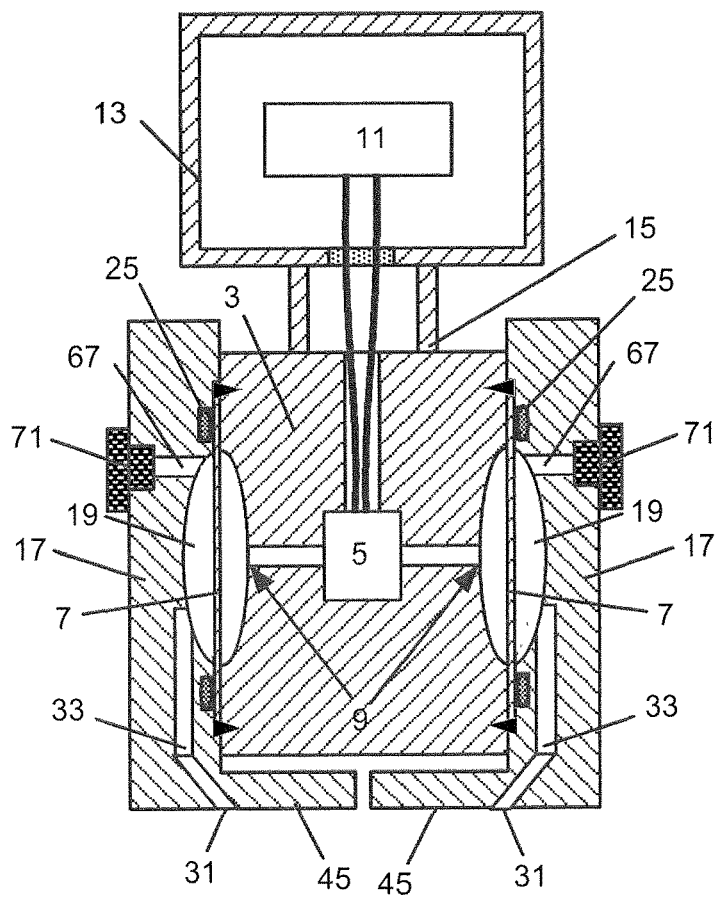
FIG. 5 is a pressure difference measuring transducer in section.

The pressure difference measuring transducers shown in FIGS. 4 and 5 comprise, in each case, a measuring mechanism 3 arranged between the two flanges 1. Measuring mechanism 3 comprises a pressure difference sensor 5 and two membranes 7 arranged on mutually opposite, external sides of the measuring mechanism 3 and, while in operation, in each case, to be loaded with one of the two pressures, whose difference is to be measured by the pressure difference measuring transducer.

The membranes 7 can be e.g. isolating diaphragms, which, in each case, outwardly terminate a pressure transfer means 9, which is connected in front of the pressure difference sensor 5 and via which a pressure acting on the outside of its isolating diaphragm is transmitted to the pressure difference sensor 5. This form of embodiment is shown in FIG. 5. Alternatively, the membranes arranged on the two mutually opposite, external sides of the measuring mechanism can, however, also be membranes, which are resistant to the medium and which belong to a pressure difference sensor arranged in the measuring mechanism, e.g. the ceramic measuring membranes of a ceramic, pressure difference sensor.

The pressure difference measuring transducer includes, connected to the pressure difference sensor 5, a measuring electronics 11, which supplies the pressure difference sensor 5 with energy and produces a measurement signal corresponding to the pressure difference metrologically registered by the pressure difference sensor 5. Measuring electronics 11 can be arranged e.g. in a housing 13, which is mounted on a neck shaped carrier 15 provided on the measuring mechanism 3.

Each flange 1 comprises a wall 17, which is formed in such a manner that, in the mounted state, it covers one of the two membranes 7 of the measuring mechanism 3 and, in such case, encloses a pressure chamber 19 bordering on such membrane 7.

The flanges 1 are mountable on the oppositely lying, external sides of the measuring mechanism 3. This mounting can occur, for example, in such a manner that the measuring mechanism 3 is clamped between the two flanges 1, in that the flanges 1 are pulled toward one another by bolts 21. For this, the flanges 1 include, extending through their walls 17, bores 23, of which each flange has preferably four, preferably arranged in a rectangle or in a square, and through which the bolts 21 can extend. A rectangular arrangement enables the flanges 1 to be assembled in two different directions reachable from one another by rotation of the flanges 1 by 180°. A quadratic arrangement enables the two flanges 1 to be assembled in four different directions reachable from one another by rotation of the flanges 1 by 90° increments. In such case, the two flanges 1 are always assembled in such a manner that the two have the same orientation. Alternatively, the flanges 1 can naturally also be mounted on the external sides of the measuring mechanism 3 via other securement means.

The sealing of the pressure chambers 19 occurs preferably by seals (not shown) clamped between the individual flanges 1 and the measuring mechanism 3. These can be inserted e.g. in groove 25 provided on the inner sides of the walls 17. Alternatively, the sealing can, however, also occur in other ways.

Each flange 1 includes a first process connection 27, which is arranged on a first of the four pairwise oppositely lying sides of its wall. The first process connection 27 includes, parallel to the first side, a process connection surface 29, which, in turn, includes a pressure duct connection region 31, into which a pressure duct 33 opens, which extends through its flange 1 to the pressure chamber 19 enclosed by the flange 1.

According to the invention, the first process connections 27 are embodied in such a manner that a pressure difference measuring transducer equipped with the flange-set is mountable and connectable via the first process connections 27 onto a process connection, which has a first process connection geometry designed for the connection and mounting of pressure difference measuring transducers having two pressure loadable membranes arranged in a plane next to one another on one and the same exterior side of its measuring mechanism.

Figure 6:
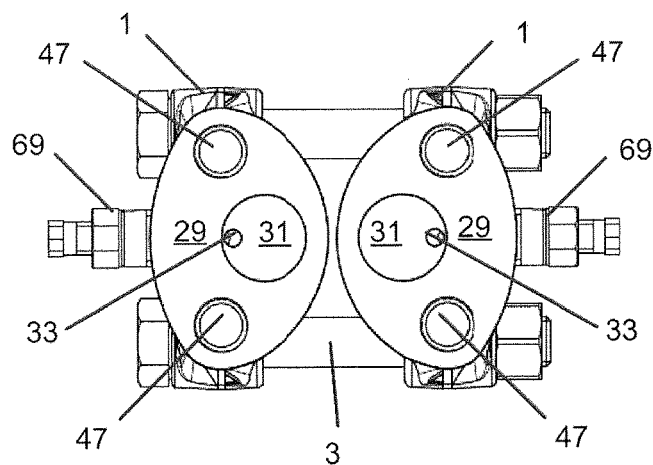
FIG. 6 is a view of the side of the pressure difference measuring transducer of FIG. 4 comprising the first process connections.

FIG. 6 shows, in this connection, a view of the outside of the pressure difference measuring transducer of FIG. 4 including the two process connection areas 29 of the two first process connections 27.

Flange-sets of the invention enable use of measuring mechanisms 3 with membranes 7 arranged on oppositely lying, external sides of the measuring mechanism 3 (without interpositioning an adapter) on process connections, which have the first process connection geometry designed for connection and mounting of measuring mechanisms with membranes arranged in one plane.

Figure 7:
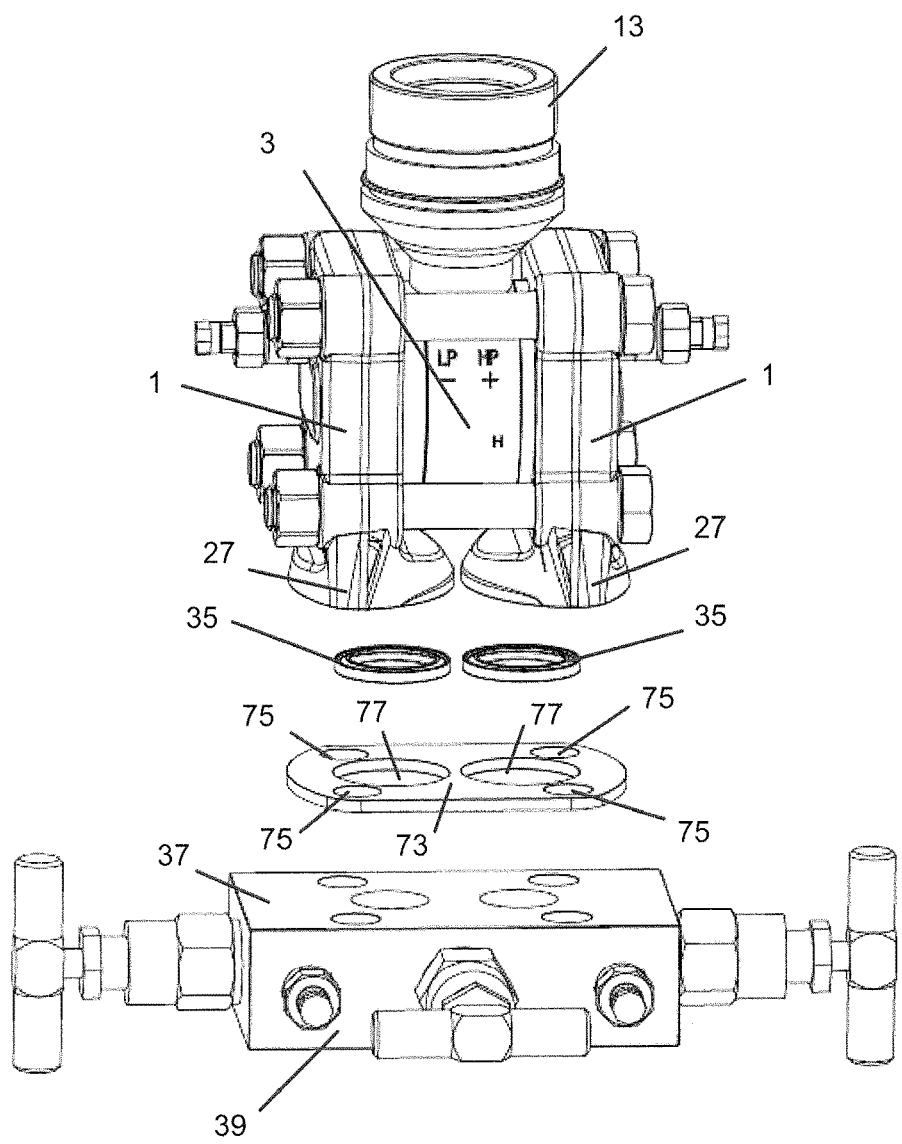
FIG. 7 is an exploded view of the pressure difference measuring transducer of FIG. 4 mounted on a valve block.

FIG. 7 shows, in this connection, an exploded view, in which the pressure difference measuring transducer shown in FIG. 4 is mounted on a process connection 37 of a valve block 39, wherein the process connection 37 has the first process connection geometry. Two process seals 35 are interposed to seal the two pressure duct connection regions 31 from the environment.

The first process connection geometry achieved according to the invention by the cooperation of the two first process connections 27 can be achieved by different embodiments of the first process connections 27.

Preferably, the first process connections 27 are on auxiliary flanges formed on the first sides. Each auxiliary flange comprises a flange region 41 adjoining the first side to which it belongs and a projection 43 adjoining an inner side of the region 41 extending parallel to the inner side of the wall 17.

FIG. 5 shows an example of an embodiment, in the case of which the auxiliary flanges 45 are embodied as disk-shaped flanges formed on the first sides and extending at right angles to the wall 17. Each disk-shaped flange comprises the flange region and the projection and has e.g. a rectangular base area.

Preferably, however, first process connections 27 are used, in the case of which the base area of the projections 43 continuously increases in the direction extending from the first side to the process connection surface 29. An example of an embodiment in this connection is shown in FIGS. 1 to 4. This structure achieves that the first process connections 27 form mechanically stable support legs, whose projections 43 can withstand significantly greater lever forces acting thereon in the case of a pressure loading of the pressure duct connection regions 31 extending over the projections 43 than in the case of disk-shaped auxiliary flanges 45. The pressure duct connection regions 31 can, thus, be supplied with significantly greater pressures, without the danger of a noticeable deformation of the projections 43, which could otherwise degrade the clamping of the process seals 35 and therewith the tightness of the sealing of the pressure transfer path.

The pressure resistance of the projections 43 can, moreover, optionally be yet further increased by providing projections 43 having circular segment shaped or ellipse segment shaped base areas increasing parallel to outwardly pointing surface normals on the first side, and/or the base areas increase in such a manner that the projections 43 form on their outside facing away from the process connection surface 29 a surface curved outwardly, as seen in section.

The first process connections 27 include, in each case, two bores 47 arranged in the flange region 41 directly adjoining the first side. These serve for accommodating securing means, such as e.g. lug bolts, via which the particular first process connection 27 is securable on half of the process connection 37 having the first process connection geometry. In such case, the bores 47 of the two flanges 1 are arranged in such a manner that the bores 47 are arranged in a rectangle in the state mounted on the measuring mechanism 3.

The pressure duct connection regions 31 of the first process connections 27 extend over a circularly shaped portion of their process connection surfaces 29, into which the pressure duct 33 opens. They are arranged centrally between the two bores 47 and offset from an imaginary line connecting the two bores 47, in an inwardly pointing direction parallel to surface normals to the inner side of the wall 17 of their flanges 1.

Fundamentally, it is sufficient that the pressure ducts 33 open into any location within the respective pressure duct connection region 31. Preferably, however, they open, in each case, into an edge region of the respective pressure duct connection region 31 facing the outside of the respective flange 1. This offers the advantage that the pressure ducts 33 extend linearly through the flanges 1 and, thus, can be simply manufactured.

The flanges 1 are preferably embodied as one-piece and therewith form elements, which are mechanically very stable. They are preferably manufactured of metal, preferably steel, preferably e.g. as one-piece cast or forged parts. Especially suitable as flange materials are, thus, especially steels, such as e.g. duplex steels or super duplex steels, which are distinguished by especially high strength. Flanges 1 of a duplex- or super duplex-steel offer the advantage that the projections 43, which are not supported by the first side, can, due to the high strength of these materials, be exposed to significantly greater pressures. In such case, the pressure duct connection regions 31 of the first process connections 27 with projections 43 of duplex steel and formed as stable support legs can be supplied with pressures up to 1000 bar, without there occurring deformation of the projections 43 compromising the sealing action of the process seals 35.

Figure 8:
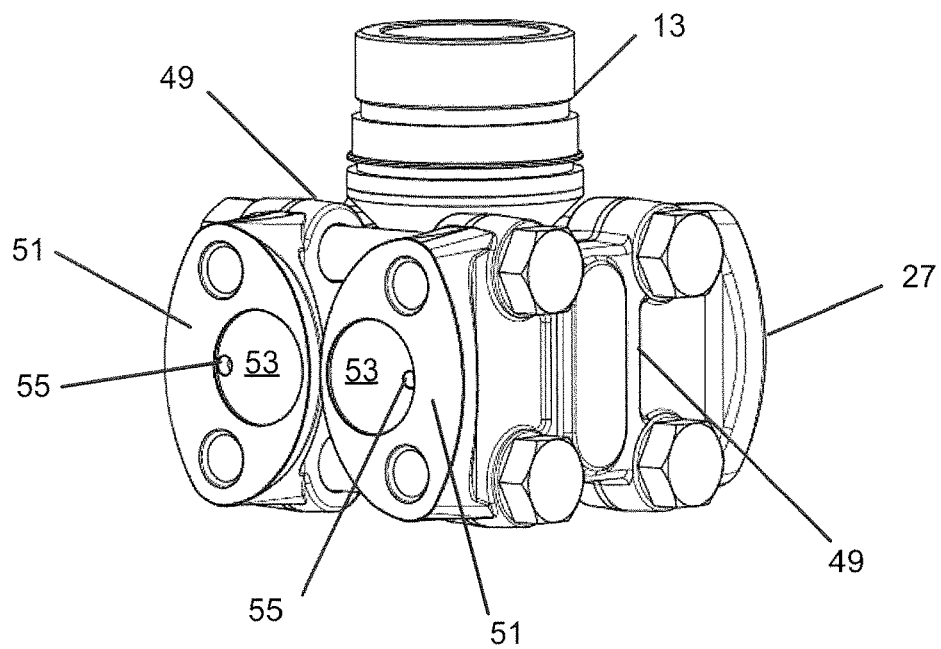
FIG. 8 is a pressure difference measuring transducer with first and second, identical, process connections.

FIG. 8 shows a view of an additional form of embodiment of a flange-set of the invention together with a measuring mechanism 3 clamped between its two flanges 49. This form of embodiment differs from that described above only by features that the two flanges 49 have supplementally to their first process connections 27, in each case, a second process connection 51 arranged on one of the other three sides of the wall 17. Also the second process connections 51 comprise, in each case, a pressure duct connection region 53, into which opens a pressure duct 55 extending through its flange 49 to the pressure chamber 19. The second process connections 51 illustrated in FIG. 8 are embodied with construction equal to that of the first process connections 27. Correspondingly, a pressure difference measuring transducer equipped with this flange-set can be mounted selectively either via the first or via the second process connections 27, 51 on process connections 37, which have the first process connection geometry.

Figure 9:
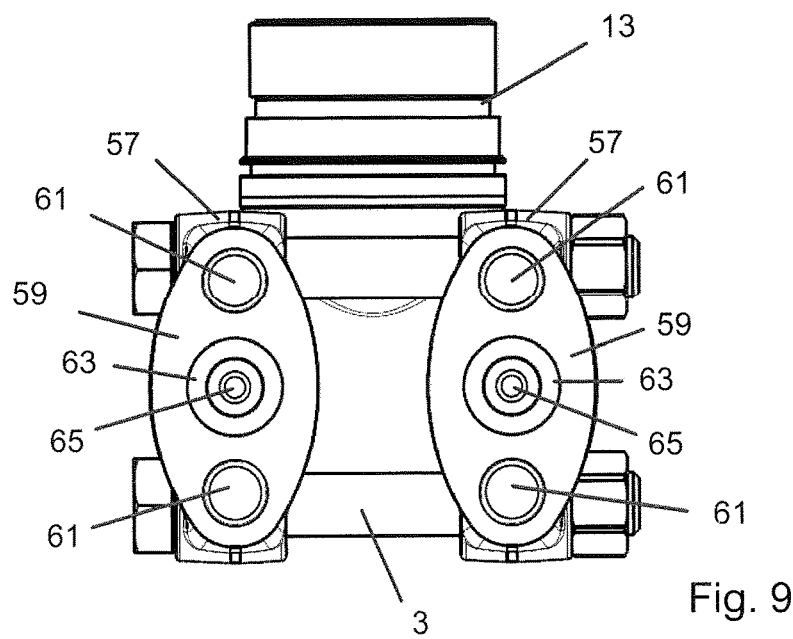
FIG. 9 is a view of a side of a pressure difference measuring transducer comprising second process connections different from the first process connections.

Alternatively, a flange-set of the invention can also comprise two flanges 57, which have, in each case, the first process connection 27 and a second, different process connection 59. FIG. 9 shows, in this connection, a view of an outside of a measuring mechanism 3 clamped between the two flanges 57, wherein the outside contains the second process connections 59. In the case of this example of an embodiment, the second process connections 59 are embodied in such a manner that a pressure difference measuring transducer equipped with the flange-set is mountable and connectable via the second process connections 59 on a process connection, which has the second process connection geometry for the connection and mounting of pressure difference measuring transducers with second process connection geometry designed with pressure loadable membranes arranged on oppositely lying, external sides of its measuring mechanism, especially the second process connection geometry set forth in the above mentioned standards.

These second process connections 59 comprise, in each case, a flange formed on the second side, especially an oval flange, two bores 61 for accommodating securing means, as well as a pressure duct connection region 63 arranged centrally between the two bores 61 on an imaginary line connecting the two bores 61, in which connection region 63 there opens a pressure duct 65 extending through its flange 57 to the associated pressure chamber 19.

Measuring transducers equipped with these flanges-sets can be mounted selectively via their first process connections 27 on process connections 37 of the first process connection geometry or via their second process connections 59 on process connections of the second process connection geometry.

Independently of their embodiment, the second process connections 51, 59 are preferably arranged on sides of the flanges 49, 57 lying opposite the first process connections 27. Pressure difference measuring transducers equipped with these flanges-sets offer the advantage that the two first or second process connections 27 or 51, 59 used for pressure loading in the case of pressure difference measurements of gaseous process media can be arranged above and, when required, condensate can be removed via the two process connections 51, 59 or 27 on the oppositely lying sides arranged below. Moreover, the two process connections 27 or 51, 59 used for pressure loading in the case of pressure difference measurements of liquid process media can be arranged below, so that, when required, a ventilation of the pressure chambers 19 can be performed via the two process connections 51, 59 or 27 arranged above on the oppositely lying sides.

Flange-sets with first and second process connections 27, 51, 59 include preferably for each flange 49, 57, in each case, an element, especially a ventilating screw 69 or a closure 71, mountable in the mounted state by means of mechanical connecting means, especially releasable connecting means, and outwardly closing the pressure duct 33, 55, 65 opening into the pressure duct connection region 31, 53, 63 of the first or the second process connection 27, 51, 59.

In the case of flange-sets, whose flanges 1 only have the first process connection 27, there can be provided in both flanges 1, optionally, in each case, extending from the pressure chamber 19 through the wall 17 of the respective flange 1 a duct 67, via which, in case needed, a ventilation of the pressure chamber 19 enclosed under the flange 1 can be performed and/or via which condensate can be removed. These ducts 67 can, such as shown here, open on the outside of the respective flange 1, opposite the pressure chamber 19. Alternatively, it can, however, also open on one of the three externally accessible sides, e.g. on the side of a flange 1 lying opposite the first side. Additionally, the ducts 67 in the flanges 1 are preferably arranged in such a manner that they open on the inner side of the respective flange 1 in an edge region of the respective pressure chamber 19 facing away from the first process connection 27.

Also, these flanges-sets include preferably for each duct 67 an element, especially a ventilating screw 69 or a closure 71, mountable by means of mechanical connecting means, especially releasable connecting means, and outwardly closing the duct 67 in the assembled state. FIGS. 4 and 6 show, in this connection, by way of example, two ventilation screws 69 also analogously usable in the examples of embodiments of FIGS. 8 and 9. FIG. 5 shows, by way of example, two closures 71 also analogously usable in the examples of embodiments of FIGS. 8 and 9.

As evident from FIG. 7, flange-sets of the inventions as well as pressure difference measuring transducers equipped therewith are preferably equipped with two process seals 35, which in the mounted state outwardly seal the pressure transfer path extending through the process connection 37 provided on the measuring point side to the associated pressure duct 33.

Applied as process seals can be seals known from the state of the art, such as e.g. O-rings.

Suited as process seals 35 are especially metal annular bodies with two sealing surfaces arranged on their mutually opposite sides, whose separation from one another is at least partially lessened elastically by the clamping of the process seal 35 between the process connection surface 29 of the respective first process connection 27 and the process connection surface of the process connection 37 provided measuring point side.

These process seals 35 can be inserted into grooves surrounding the pressure duct connection regions 31 externally on all sides. In such case, the depth of the groove determines the compression the process seal 35 experiences in the clamped state.

Alternatively, the compression of the process seals 35 can be set via a sealing plate 73—shown in FIG. 7 as an option—to be clamped between the process connection areas 29 of the two first process connections 27 and the process connection surface of the process connection 37 to be connected therewith in a predeterminable manner significantly more precisely via the thickness of the sealing plate 73. In the case of this embodiment, the sealing plate 73 has a thickness, which corresponds to the thickness of the process seals 35 in the clamped state.

Especially suited as sealing plate 73 is an one-piece, preferably metal, plate, which has, arranged in a rectangle, four passageways 75, which in the state laid against the process connection areas 29 of the first process connections 27 match the bores 47 of the two first process connections 27, and which has two further passageways 77, which, in the laid on state, match the pressure duct connection regions 31 of the two first process connections 29. Insofar, suited especially are sealing plates, which are embodied analogously to the plate-shaped separators described in DE 10 2014 102 719 A1, there arranged on an outside of a measuring mechanism of a pressure difference measuring transducer, an outside surrounding one of two membranes arranged in a plane next to one another.

Figure 10:
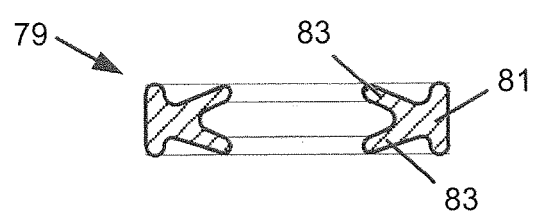
FIG. 10 is a process seal.

The additional passageways 77 can be embodied, for example, as seal seats for accommodating, in each case, one of the two process seals 35. In that case, the process seals 35 can be embodied as separate components insertable in press fit or in loose fit in the seal seats or, however, as components connected with the sealing plate 73. In such case, instead of the process seals 35 illustrated in FIG. 7 alternatively also other seal geometries having process seals can be applied. FIG. 10 shows, in this connection, a sectional drawing of an example of an embodiment of a process seal 79, which comprises a cylindrical, form-retaining base body 81, on which two radially inwardly extending spring leg 83 are formed in such a manner that, in section, an essentially K-shaped profile results.

Figure 11:
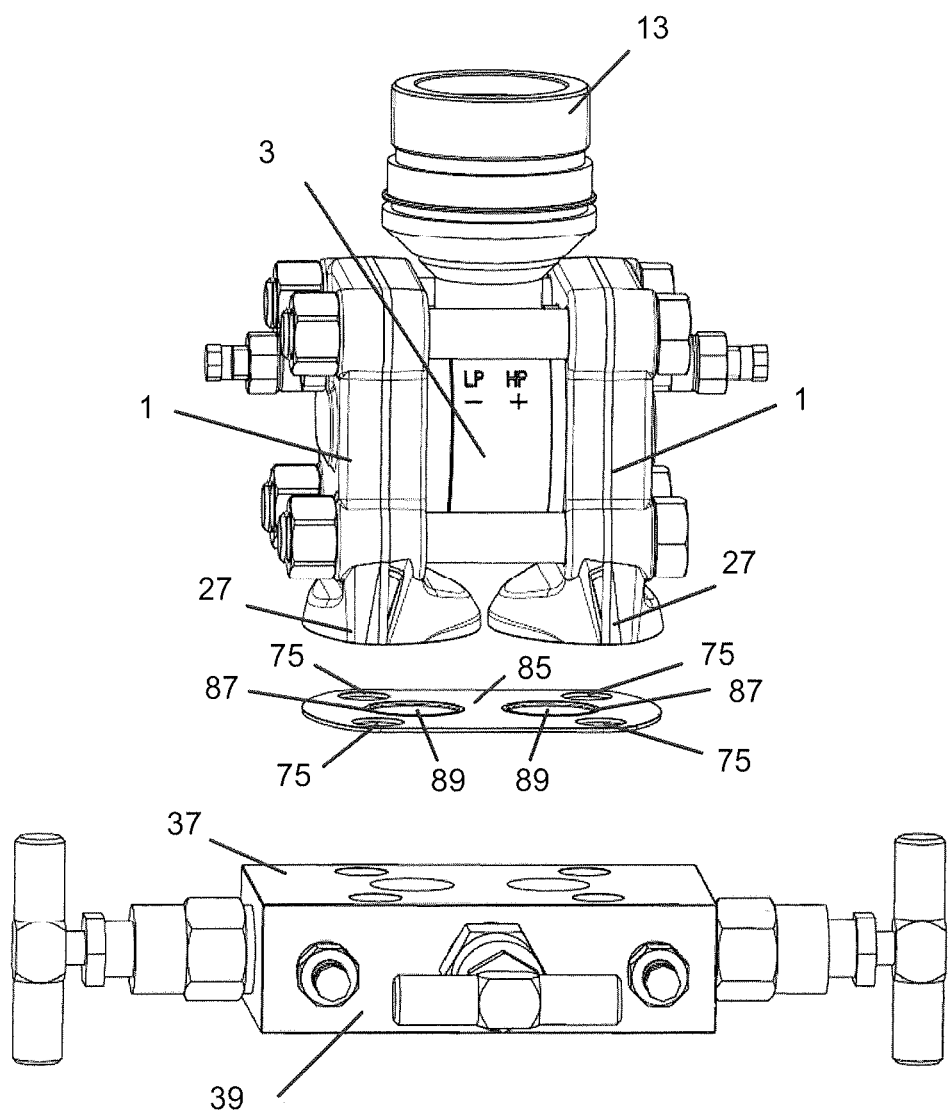
FIG. 11 is an exploded view of the pressure difference measuring transducer of FIG. 4 mounted on a valve block with interpositioning of a process seal comprising a sealing plate.

Another alternative shown in FIG. 11 has a sealing plate 85, which includes process seals 87 embodied as integral components of the sealing plate. This form of embodiment differs from the sealing plate 73 illustrated in FIG. 7 by the feature that each of the two additional passageways 89 is surrounded externally on all sides by a plate region acting as process seal 89. This plate region can comprise e.g. concentric, annular ribs produced by plastic deformation on both sides of the sealing plate, or, however, be offset by plastic deformation into a new, axially offset equilibrium position relative to the planar surfaces of the sealing plate.

While sealing plates 85 with integrated process seals 87 have preferably a smaller thickness, especially a thickness of 0.8 mm to 2.0 mm, sealing plates 73 with additional passageways 77 formed as seal seats can in the case of corresponding matching of the thickness of the process seal 35 to be accommodated have a greater thickness, especially a thickness of 2.4 mm to 4.0 mm.

Independently of the selected seal geometry, optionally a non-metallic coating can be provided on one or on both sealing surfaces of the process seals 35, 79, 87. Suited for this are e.g. thermoplastic coatings, such as e.g. coatings of a fluoropolymer, e.g. of polytetrafluoroethylene (PTFE) or of a perfluoroalkoxy-polymer (PFA), or coatings of composite materials containing such fluoropolymers.

The invention claimed is:

1. A flange-set for a pressure difference measuring transducer with two flanges mountable on external sides of a measuring mechanism of the pressure difference measuring transducer lying opposite one another and containing membranes to be loaded with pressures, each of said flanges comprises:
   a wall, which in a mounted state covers one of the two membranes of said measuring mechanism and encloses a pressure chamber bordering on such membrane; and
   a first process connection arranged on a first of four, pairwise oppositely lying sides of said wall, which includes a pressure duct connection region, in which opens a pressure duct extending through the flange to the pressure chamber, wherein:
   said first process connections are embodied in such a manner that a pressure difference measuring transducer equipped with the flange-set is mountable and connectable via said first process connections on a process connection, which has a first process connection geometry designed for the connection and mounting of pressure difference measuring transducers with two pressure loadable membranes arranged on one and the same external side of their measuring mechanism;
   wherein said first process connections each include two bores, which serve for accommodating securing means, especially bolts, via which said first process connection is securable on half of a process connection having the first process connection geometry, and which are arranged in such a manner that the bores of the two flanges in the mounted state on said measuring mechanism are arranged in a rectangle; and said pressure duct connection regions of said first process connections are each arranged centrally between said two bores and offset in a direction parallel to a surface normal to the inner side of the wall of the flange inwardly pointing from an imaginary line connecting two bores.

2. The flange-set as claimed in claim 1, wherein:
said first process connections are formed on first sides and comprise auxiliary flanges, each of which comprises a flange region adjoining the first side and a projection following on its inner side directed parallel to an inner side of said wall.

3. The flange-set as claimed in claim 2, wherein:
the base areas of said projections continuously increase in direction extending from the first side to a process connection surface of the respective first process connection, wherein the base areas are especially essentially circular segment shaped or ellipse segment shaped base areas and/or the base areas especially increase in such a manner that said projections form on their exterior facing away from said process connection surface an outwardly curved surface as viewed in section.

4. The flange-set as claimed in claim 1, wherein:
in each case, a duct is provided in both flanges, extending in each case through said flange wall and opening into said pressure chamber enclosed by the flange, especially into an edge region of said pressure chamber facing away from said first process connection; and
an element, especially a ventilating screw or a closure, which is mountable by mechanical connecting means, especially releasable connecting means, and which, in the mounted state, outwardly closes the duct, is provided for each duct.

5. The flange-set as claimed in claim 2, wherein:
each of the flanges has, arranged on a second side, especially on a second side lying opposite the first side, an second process connection, which includes a pressure duct connection region, into which opens a pressure duct extending through the flange to said pressure chamber.

6. The flange-set as claimed in claim 5, wherein:
said second process connections are embodied in such a manner that a pressure difference measuring transducer equipped with the flange-set is mountable and connectable via said second process connections on a process connection, which has a second process connection geometry designed for the connection and mounting of pressure difference measuring transducers with pressure loadable membranes arranged on oppositely lying sides of its measuring mechanism; and
each of said second process connections comprises a flange formed on the second side, especially an oval flange, in which the pressure duct connection region is arranged centrally on an imaginary line connecting two bores for accommodating securing means.

7. The flange-set as claimed in claim 5, wherein:
said second process connections are of equal construction to said first process connections.

8. The flange-set as claimed in claim 5, wherein:
an element is provided for each flange, especially an element in the form of a ventilating screw or a closure, which is mountable on said flange by means of mechanical connecting means, especially releasable connecting means, and which, in the mounted state, outwardly closes a pressure duct opening into the pressure duct connection region of said first or second process connection.

9. The flange-set as claimed in claim 1, wherein:
each of said pressure ducts in said first process connections opens in an edge region of the associated pressure duct connection region facing an outside of its flange.

10. The flange-set as claimed in claim 1, wherein:
the flanges are embodied of metal, especially a steel, especially a duplex steel or a super duplex steel, wherein they are especially embodied as a one-piece elements, especially as one-piece cast or forged parts.

11. A pressure difference measuring transducer equipped with a flange-set for a pressure difference measuring transducer with two flanges mountable on external sides of a measuring mechanism of the pressure difference measuring transducer lying opposite one another and containing membranes to be loaded with pressures, each of said flanges comprises:
a wall, which in a mounted state covers one of the two membranes of said measuring mechanism and encloses a pressure chamber bordering on such membrane; and
a first process connection arranged on a first of four, pairwise oppositely lying sides of said wall, which includes a pressure duct connection region, in which opens a pressure duct extending through the flange to the pressure chamber, wherein:
said first process connections are embodied in such a manner that a pressure difference measuring transducer equipped with the flange-set is mountable and connectable via said first process connections on a process connection, which has a first process connection geometry designed for the connection and mounting of pressure difference measuring transducers with two pressure loadable membranes arranged on one and the same external side of their measuring mechanism, wherein:
the pressure difference measuring transducer includes a measuring mechanism equipped with a pressure difference sensor and having two pressure loadable membranes arranged on external sides of said measuring mechanism lying opposite one another; and
said two flanges are mounted on oppositely lying external sides of said measuring mechanism in an orientation relative to said measuring mechanism such that their first process connections are arranged next to one another in a plane;
wherein said first process connections each include two bores, which serve for accommodating securing means, especially bolts, via which said first process connection is securable on half of a process connection having the first process connection geometry, and which are arranged in such a manner that the bores of the two flanges in the mounted state on said measuring mechanism are arranged in a rectangle; and
said pressure duct connection regions of said first process connections are each arranged centrally between said two bores and offset in a direction parallel to a surface normal to the inner side of the wall of the flange inwardly pointing from an imaginary line connecting two bores.

12. The pressure difference measuring transducer as claimed in claim 11, wherein:
a sealing plate is provided, which is placeable on process connection areas of said first process connections of said flanges, and, in the case of mounting the measuring transducer on a process connection, is clampable between the process connection areas of the two first process connections and the process connection surface of a process connection; and said sealing plate includes two passageways, which, in an emplaced state, give access to the pressure duct connection regions of said first process connections, and which form seal seats for accommodating process seals or are surrounded externally on all sides by a plate region of the sealing plate formed as a process seal.

13. The pressure difference measuring transducer as claimed in claim 11, wherein:

said pressure difference measuring transducer is mounted by means of the first process connections with interpositioning of two process seals on a process connection having the first process connection geometry.

14. The pressure difference measuring transducer as claimed in claim 12, wherein:

said process seals are process seals inserted with press fit or loose fit into further passageways in a sealing plate clamped between said first process connections and the process connection and exposing the pressure duct connection regions;

said process seals comprise a cylindrical, form-retaining, base body, on which two radially inwardly extending spring leg are formed in such a manner that said process seals have in cross section an essentially K-shaped profile; or said process seals are formed by plate regions of a sealing plate clamped between said first process connections and the process connection, which plate regions surround, externally all sides;

further passageways of said sealing plate exposing the pressure duct connection regions, wherein the plate regions especially comprise concentric, annular ribs produced by plastic deformation on both sides of the sealing plate or are offset by plastic deformation in a new, axially offset equilibrium position relative to the planar surfaces of said sealing plate; or said process seals have a non-metallic coating, especially a thermoplastic coating, especially a coating of a fluoropolymer, especially polytetrafluoroethylene (PTFE) or perfluoroalkoxy-polymer (PFA), or a coating of a composite material containing fluoropolymer.

* * * * *